(12) United States Patent
Friedman et al.

(10) Patent No.: US 11,018,747 B2
(45) Date of Patent: *May 25, 2021

(54) CONFIGURABLE POLARIMETRIC PHASED ARRAY TRANSCEIVER ARCHITECTURE

(71) Applicants: INTERNATIONAL BUSINESS MACHINES CORPORATION, Armonk, NY (US); Ericsson AB, Stockholm (SE)

(72) Inventors: Daniel J. Friedman, Sleepy Hollow, NY (US); Joakim Hallin, Askim (SE); Yahya Mesgarpour Tousi, Minnetonka, MN (US); Orjan Renstrom, Stockholm (SE); Leonard Rexberg, Stockholm (SE); Scott K. Reynolds, Yorktown Heights, NY (US); Bodhisatwa Sadhu, Peekskill, NY (US); Stefan Sahl, Solna (SE); Jan-Erik Thillberg, Stockholm (SE); Alberto Valdes Garcia, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,915

(22) Filed: Aug. 2, 2019

(65) Prior Publication Data

US 2019/0356375 A1 Nov. 21, 2019

Related U.S. Application Data

(63) Continuation of application No. 15/596,672, filed on May 16, 2017, now Pat. No. 10,425,143.

(Continued)

(51) Int. Cl.
*H04B 7/06* (2006.01)
*H01Q 3/24* (2006.01)
(Continued)

(52) U.S. Cl.
CPC ............ *H04B 7/0686* (2013.01); *H01Q 3/24* (2013.01); *H01Q 21/29* (2013.01);
(Continued)

(58) Field of Classification Search
CPC .. H01Q 3/26; H01Q 3/36; H01Q 3/38; H01Q 21/22; H04B 7/0408
(Continued)

(56) References Cited

U.S. PATENT DOCUMENTS 9,191,057 B2 11/2015 Ainspan et al.
9,490,548 B2 11/2016 Weissman et al.
(Continued)

OTHER PUBLICATIONS

List of IBM Patents or Applications Treated as Related.

*Primary Examiner* — Lee Nguyen
(74) *Attorney, Agent, or Firm* — Intelletek Law Group, PLLC; Gabriel Daniel, Esq.

(57) ABSTRACT

A method and system of a configurable phased array transceiver are provided. A first beamforming unit is configured to provide a first beam. A second beamforming unit is configured to provide a second beam. A first bi-directional power controller is configured to combine or to split the first beam and the second beam. Each beamforming unit comprises a plurality of radio frequency (RF) front-ends, each front-end being configured to transmit and receive RF signals. Each beam is independently configurable to operate in a transmit (TX) or a receive (RX) mode.

20 Claims, 6 Drawing Sheets

300

| Configuration | 1 | 2 | 3 |
|---|---|---|---|
| Description | Two simultaneous 16-element beams (TX or RX) | Four simultaneous beams (two 8-element RX, two 8-element TX) | Three simultaneous beams (one 16-element TX or RX, one 8-element RX and one 8-Element TX) |
| BF1 (H) | TX or RX | TX | TX or RX |
| BF2 (H) | | RX | |
| BF3 (V) | TX or RX | TX | TX |
| BF4 (V) | | RX | RX |

Related U.S. Application Data

(60) Provisional application No. 62/385,212, filed on Sep. 8, 2016.

(51) Int. Cl.
    *H04B 7/0408*     (2017.01)
    *H01Q 21/29*     (2006.01)
    *H04L 5/14*     (2006.01)
    *H04W 52/42*     (2009.01)
    *H01Q 25/00*     (2006.01)

(52) U.S. Cl.
    CPC ........... *H04B 7/0408* (2013.01); *H04L 5/143* (2013.01); *H04L 5/1469* (2013.01); *H04W 52/42* (2013.01); *H01Q 25/001* (2013.01); *H04B 7/0617* (2013.01)

(58) Field of Classification Search
    USPC ....................... 342/354, 368, 371, 374, 377
    See application file for complete search history.

(56) References Cited

U.S. PATENT DOCUMENTS

| | | | |
|---|---|---|---|
| 9,923,270 B1 * | 3/2018 | Little | H01Q 3/38 |
| 10,425,143 B2 * | 9/2019 | Friedman | H01Q 3/24 |
| 2011/0063169 A1 | 3/2011 | Chen et al. | |
| 2017/0346506 A1 | 11/2017 | Perumana et al. | |

* cited by examiner

| Configuration | 1 | 2 | 3 |
|---|---|---|---|
| Description | Two simultaneous 16-element beams (TX or RX) | Four simultaneous beams (two 8-element RX, two 8-element TX) | Three simultaneous beams (one 16-element TX or RX, one 8-element RX and one 8-Element TX) |
| BF1 (H) | TX or RX | TX | TX or RX |
| BF2 (H) | TX or RX | RX | TX or RX |
| BF3 (V) | | TX | TX |
| BF4 (V) | | RX | RX |

CONFIGURABLE POLARIMETRIC PHASED ARRAY TRANSCEIVER ARCHITECTURE

BACKGROUND

Technical Field

The present application generally relates to telecommunication systems, and more particularly, to low latency and high data rate communication systems.

Description of the Related Art

Next generation mobile technology, such as 5G technology, continuously strives to provide an improved experience through higher data rates, lower latency, and improved link robustness. To that end, phased arrays offer a path to support multiple users with high data rates using high-bandwidth directional links between the base station and mobile devices. A phased array is an array of antennas where the relative phase of each antenna is configured such that the effective radiation pattern of the combined array is reinforced in a target direction and attenuated in undesired directions. This radiation pattern of the array is electronically steerable to form a focused beam in a particular direction. Accordingly, multiple antennas, work together to form a single unidirectional antenna.

SUMMARY

According to an embodiment of the present disclosure, a configurable phased array transceiver is provided. A first beamforming unit is configured to provide a first beam. A second beamforming unit is configured to provide a second beam. A first bi-directional power controller is configured to combine or to split the first beam and the second beam. Each beamforming unit comprises a plurality of radio frequency (RF) front-ends, each front-end being configured to transmit or receive RF signals. Each beamforming unit is independently configurable to operate in a transmit (TX) or a receive (RX) mode. A full array (e.g., with two or more beamformers and power controllers) can have one or more beamformers operating in one mode (e.g., TX) while the other one or more beamformers operate in the opposite mode (e.g., RX).

In one embodiment, there is a third beamforming unit configured to provide a third beam, and a fourth beamforming unit configured to provide a fourth beam. There is a second bi-directional power controller configured to combine or to split the third beam and the fourth beam.

According to an embodiment of the present disclosure, a method of providing a configurable phased array transceiver, is provided. A first beam is provided via a first beamforming unit. A second beam is provided via a second beamforming unit. A first bi-directional power controller is configured to combine or to split the first beam and the second beam. Each beamforming unit comprises a plurality of radio frequency (RF) front-ends, each front-end being configured to transmit and receive RF signals. Each beam is independently configurable to operate in a transmit (TX) or a receive (RX) mode.

In other embodiments, additional beamforming elements are provided. There are additional one or more bi-directional power controllers that are configured to combine or to split the additional signals from the additional beamforming elements.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary embodiments described herein provide improved wireless experience through higher data rates, lower latency, and improved link robustness. To that end, mmWave phased arrays support multiple users at high data rates using high-bandwidth directional links between the base station and mobile devices. A phased array-based pico-cell supports a large number of precisely controlled beams, while being compact and power efficient. The teachings herein provide scalability of the Radio Frequency Integrated Circuit (RFIC)+antenna-array solution, flexibility to provide a number of concurrent beams, and support for dual polarization. As used herein, the term polarization refers to the orientation of the electric field of the radio wave with respect to the Earth's surface.

While phased arrays supporting concurrent dual-polarized receiver (RX) operation and Si-based scaling may exist, concurrent dual polarized operation in both TX and RX modes remains unaddressed. In one embodiment, the RFIC discussed herein supports simultaneous dual-polarized operation in TX and RX modes, as well as configurable number of beams and antenna elements per beam. The overall solution is compatible with a volume-efficient, scaled, antenna-in-package array solution. Reference now is made in detail to the examples illustrated in the accompanying drawings and discussed below.

Example Architecture

Figure 1:
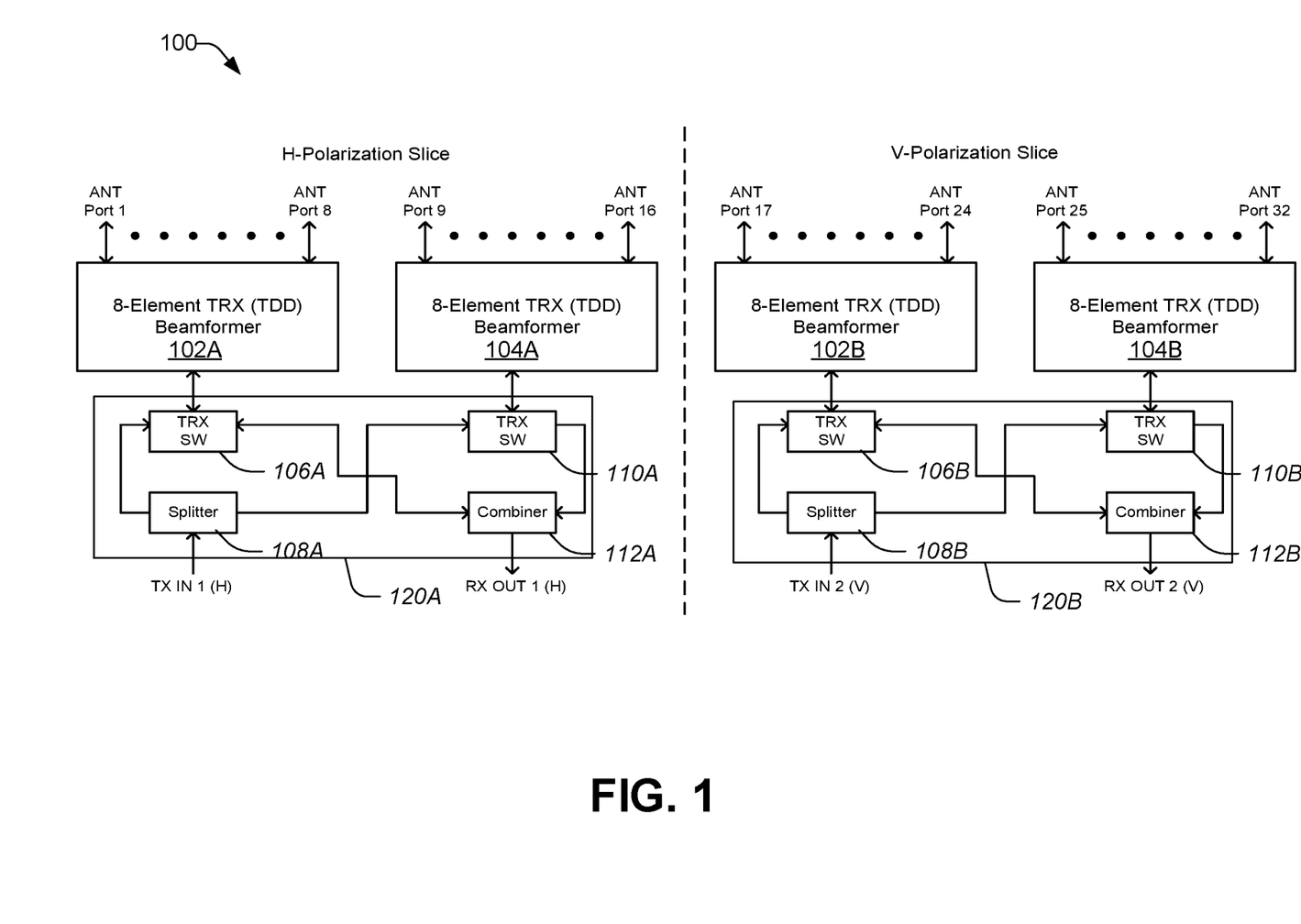
FIG. 1 is a conceptual block diagram of a configurable phase array, consistent with an illustrative embodiment.

FIG. 1 is a conceptual block diagram of a configurable phase array 100, consistent with an illustrative embodiment. In the example of FIG. 1, the architecture of the phased array 100 is separated into two polarization planes, namely horizontal (i.e., on the left side) and vertical (i.e., on the right side). By way of example only, and not by way of limitation, FIG. 1 illustrates four independent eight element transceiver (TRX) beamforming units, while it will be understood that there could be M number of beamforming units, each having an N number of beamforming units.

Each beamforming unit is bidirectional in that it can both transmit and receive signals. Accordingly, in the example of FIG. 1, four independent beams can be supported simultaneously. For example, two can be operated in transmit (TX) mode and two can operated in receive (RX) mode. In another example, all four beams may be in TX mode or all in RX mode. Other combinations are discussed in more detail later.

As used herein, the term "beamforming" refers to a signal processing technique that uses antenna arrays for directional signal transmission or reception. This technique is achieved by combining elements in a phased array in such a way that signals at particular angles experience constructive interference while others experience destructive interference. Thus, an array of antennas controlled by a beamformer element are configured to operate as a single antenna for a desired direction without any mechanically moving parts.

Beamforming can be used at both the transmitting and receiving ends in order to achieve spatial selectivity. For example, to change the direction of the array when transmitting, a beamformer element controls the phase and relative amplitude of the signal at each transmitter, in order to create a pattern of constructive and destructive interference in the wavefront. When receiving, information from different sensors is combined in a way where the expected pattern of radiation is observed.

Each beamforming unit (102A, 104A, 102B, and 104B) is configured to provide a beam, which may be independent. Each beamforming unit comprises a plurality of radio frequency (RF) front-ends, wherein each is configured to transmit and receive RF signals. In one embodiment, the transmit and receive functions are supported in a time division duplexing (TDD) architecture for each front end. Each front-end provides an independent port to an antenna. Simultaneous TX and RX is possible at the array level. Additional features of a beamforming unit are discussed in detail later.

Each polarization plane includes a bidirectional power controller, sometimes referred to herein simply as a controller. Each controller 120A and 120B is configured to combine or to split beams. For example, controller 120A can combine a beam from the beamforming unit 102A with a beam from the beamforming unit 104A. Controller 120A is also configured to split the beams from beamforming units 102A. To that end, each beamforming unit includes a first switch 106 coupled to the first beamforming unit 102 and a second switch 110 coupled to the coupled to the first beamforming unit 104. There is a splitter coupled between a first input of the first switch 106 and a first input of the second switch 110. The splitter 108 is configured to split an incoming transmission signal and provide it to the first switch 106 and the second switch 110. In various embodiments, the splitter can be passive or active. There is a combiner 112 coupled between the second input of the first switch 106 and the second input of the second switch 110. The combiner 112 is configured combine the beam from the first beamforming unit 102 with that of the second beamforming unit 104 to provide a more powerful and focused single beam.

For example, for the left polarization plane, when the controller 120A combines the beam from the first beamforming unit 102A with that of the second beamforming unit 104A, a more powerful and focused beam is created that has the potential of traveling a longer distance. However, if the controller 120A splits the beam from the first beamforming unit 102A from the second beamforming unit 104A, two separate independent beams are provided that can communicate with a separate base station. Accordingly, by using the architecture described herein, configurability is provided that offers the flexibility of a tradeoff between power/precision versus a number of less powerful beams to be implemented.

Figure 2:
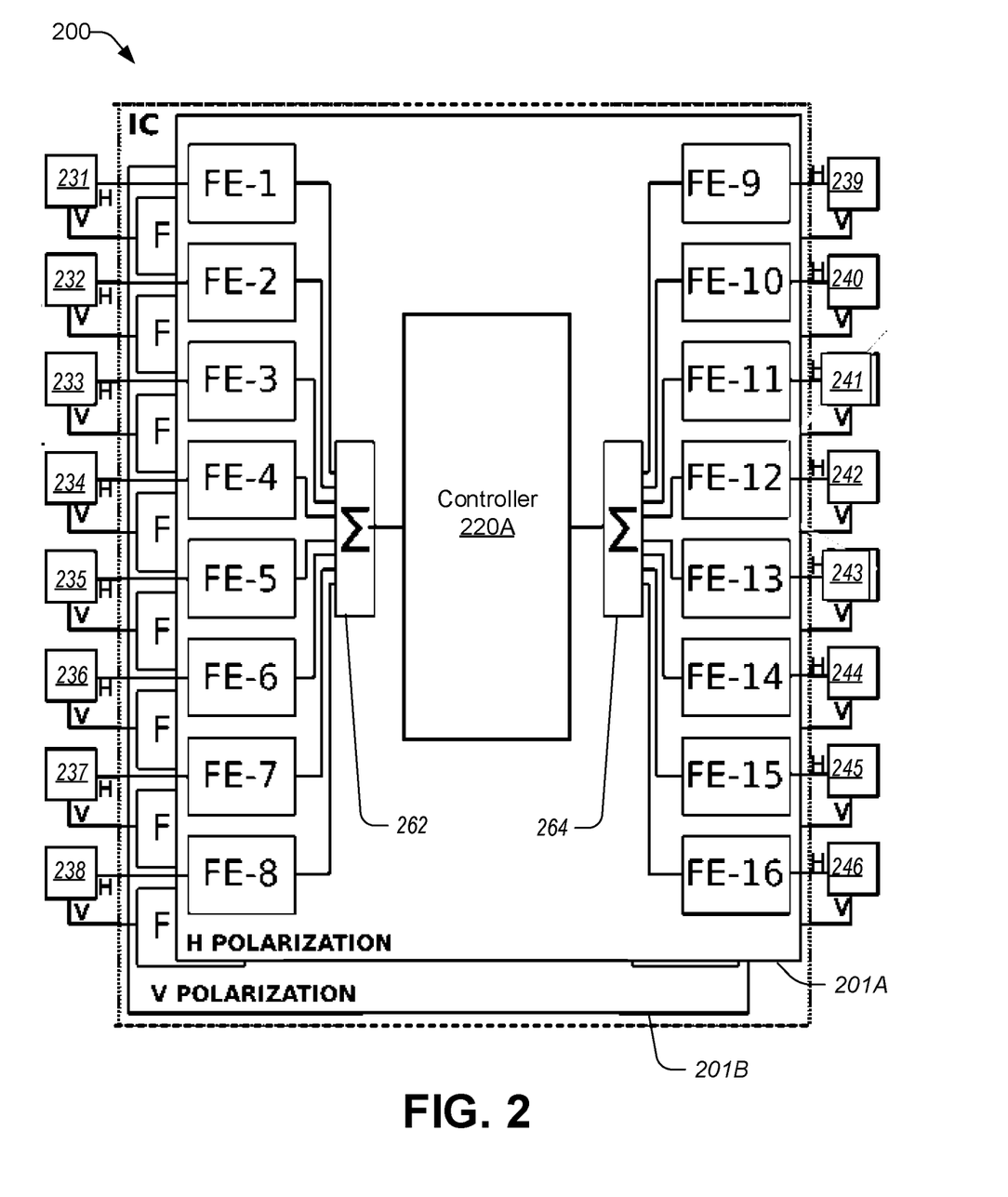
FIG. 2 is an example floorplan of a sixteen-element array for each polarization plane, consistent with an illustrative embodiment.

Reference now is made to FIG. 2, which is an example floorplan of a sixteen element array for each polarization plane, consistent with an illustrative embodiment. The horizontal polarization plane 201A is illustrated to be above the vertical polarization plane 201B for discussion purposes only, not by way of limitation. In various embodiments, the polarization planes may be stacked on top of one another or may be adjacent, depending on the technology used.

The left half of each polarization plane is substantially similar to the right half. Further, each polarization plane is substantially similar. Accordingly, the discussion will focus on the horizontal polarization plane 201A, while it will be understood that the vertical polarization plane 201B has a substantially similar architecture.

In the example of FIG. 2, each polarization plane has two beamforming units, each beamforming unit comprising eight front-ends (FEs), each with its corresponding antenna. For example, FE-1 to FE-8 are coupled to antennas 231 to 238, respectively. Each side of a polarization plane has a summation element 262 and 264, respectively. Each summation element (e.g., 262) has an interface for its corresponding front end (e.g., FE-1 to FE-8). Each summation element is bidirectional in that it is configured to receive signals from the antenna via its corresponding front, and to provide signals to each front end, such that its corresponding antenna can transmit desired signals.

The architecture of FIG. 2 may be a monolithic RFIC that includes 2 independent 16-element phased array transceivers (TRX), enabling two simultaneous and independent 16-element beams in either TX or RX mode. These 16×2 radio frequency (RF) ports can be configured to interface with 16 dual-polarized in-package antennas to create simultaneous H and V polarization beams, or with 32 single-polarized antennas to create a narrower 32-element beam. To realize a compact overall solution, the IC may use an RF-phase shifting architecture that minimizes the number of circuit components.

In one embodiment, each transceiver FE couples to an antenna port (either H or V polarization). TX and RX functions in the FE share a single passive radio frequency (RF) phase shifter and TDD operation (alternating between TX and RX modes of operation) is accomplished by using three T/R switches (e.g., the IC of FIG. 2 may use a 2-step, sliding-IF frequency conversion architecture with a 28 GHz RF, 8 GHz internal intermediate frequency (IF), and 3 GHz external IF). The two polarization planes share a 5 GHz input that is multiplied to 20 GHz to create the RF-LO, and is then divided to 10 GHz to create the IF-LO. The phased array combining/splitting is achieved in two steps: (i) 2 sets of 8 signals are combined/split at RF using Wilkinson combiner/splitters; (ii) these 2 sets are further combined/split in the current domain at the 8 GHz internal IF. At the nominal cost of an extra mixer per path, this 8×2 architecture achieves higher linearity since the RF mixers handle only 8 combined signals as compared to 16 combined signals in the most hardware efficient 16×1 solution.

Figure 3:
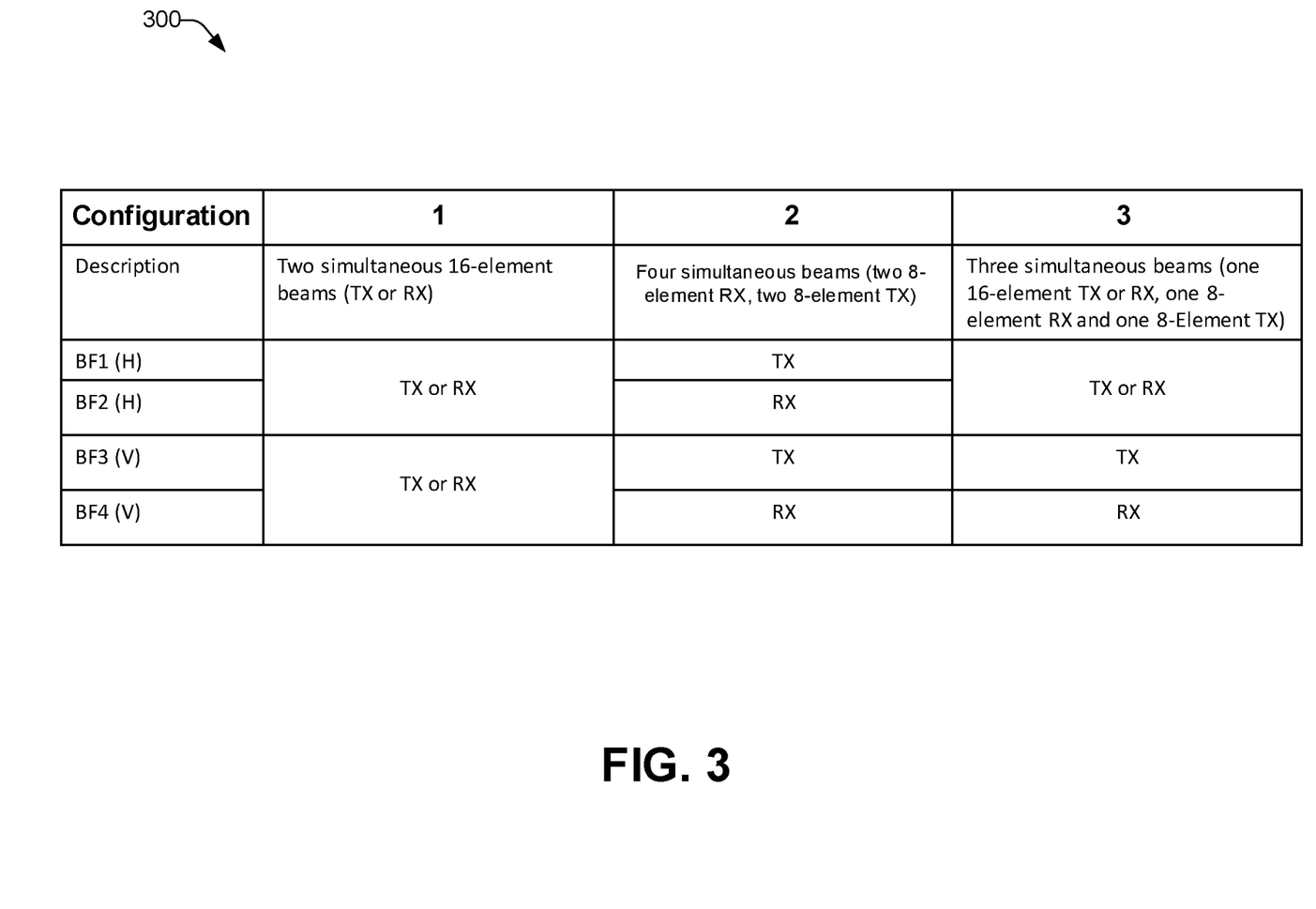
FIG. 3 illustrates an example table for the different configurations of the architecture of FIG. 1.

FIG. 3. illustrates an example table for the different configurations of the architecture of FIG. 1. Table 300 lists the four beam forming units BF1 (H), BF2 (H), BF3 (V), and BF4(V), which for discussion purposes can be related to the beamforming units 102A, 104A, 102B, and 104B of FIG. 1, respectively.

In a first configuration, both polarization planes are configured to be in a transmit mode (TX) or a receive mode (RX). Accordingly, a single 32-element TX or RX beam can be formed if a second tier controller is used, discussed in more detail later. Accordingly, a high power and focused unidirectional beam is provided in the first configuration, which trades off the number of independent beams for power and precision.

In the second configuration, part of the beam forming units are configured to transmit, while others are in receive state. For example, BF1(H) and BF3(V) are configured to be in TX mode, whereas BF2 (H) and BF4(V) are configured to be in RX mode. Accordingly, four simultaneous beams (i.e., two 8 element RX, and two 8 element TX) can be provided. Accordingly, more independent beams are provided having the tradeoff of reduced power and precision.

It should be noted that the number of beams that are in transmit mode can be the same or different from the number in receive mode. To that end, the third configuration is a scenario where there are three simultaneous beams, namely a single 16 element TX or RX, one 8 element Rx and one 8 element TX. For example, BF1(H) and BF2 (H) are in TX or RX mode to provide a single 16 element focused beam. Two additional independent beams are provided by BF3(V) (i.e., in TX) and BF4 (V) in RX. In this way, BF1(H) and BF2(H) can provide a more powerful and focused beam for its communication, whereas, the remainder of the bandwidth is allocated to less focused and less powerful communication via BF3(V) and BF4(V).

Thus, by virtue of the configurability discussed herein, a phased array transceiver can be implemented that is configurable to provide directional communication in one or more predetermined directions simultaneously. Put differently, all antennas can be used to form a single beam, thereby creating a powerful and narrowly focused beam. Alternatively, the antennas can be divided into different configurations to provide multiple independent beams simultaneously, wherein each beam can be focused in a different direction. The larger the number of independent beams that are implemented, the less narrow the focus of each beam, which, in many applications, is an acceptable tradeoff to achieve such degree of flexibility. For example, a user equipment having a phased array may be used to communicate with several other user equipment (or receivers) simultaneously, that may be in close proximity (e.g., at a sports stadium). The same user equipment may later be used to provide clear communication with a base station that is relatively further away by reconfiguring the phased array to provide a single powerful and focused beam.

Figure 4:
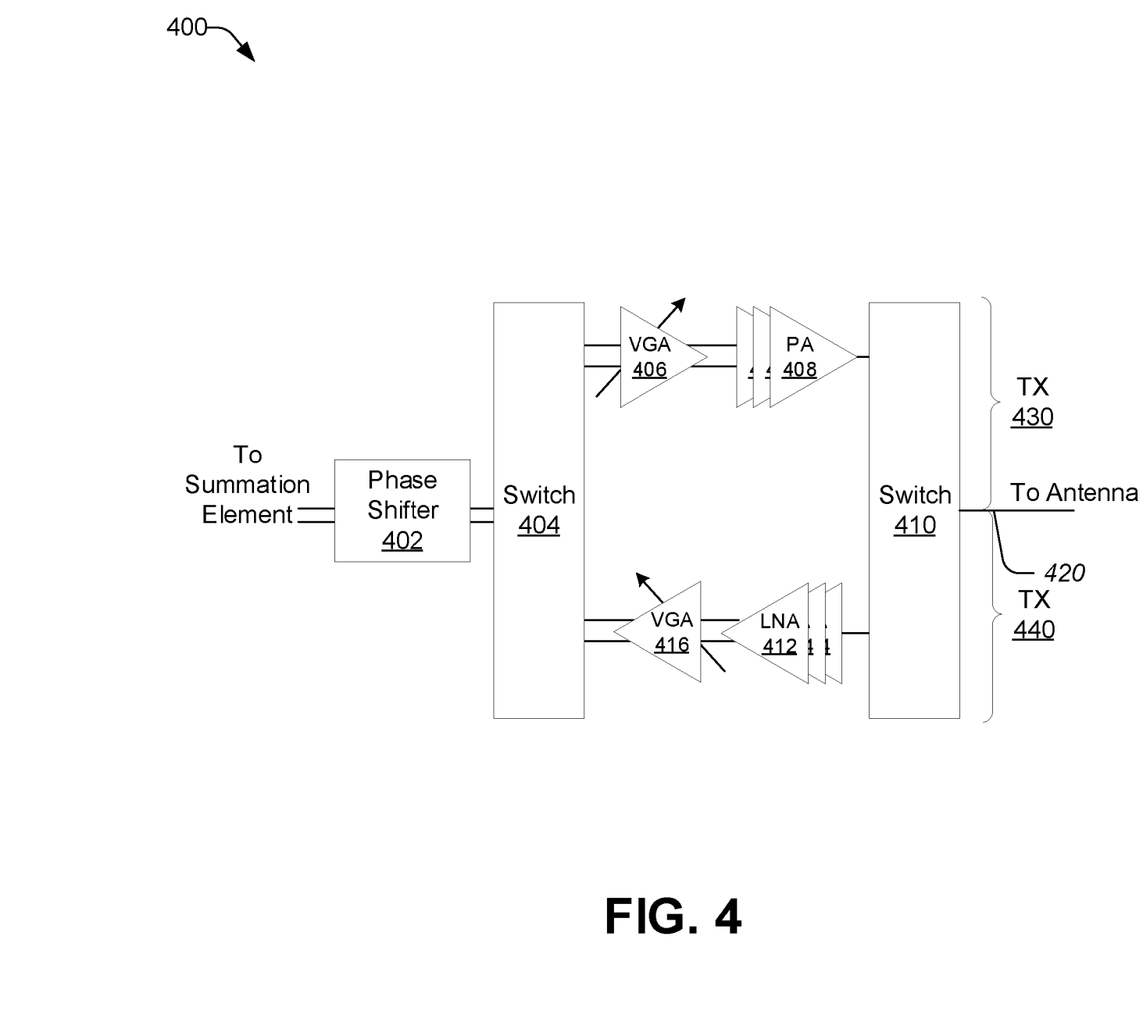
FIG. 4 is an example front end (FE) configured to control an antenna at its output, consistent with an illustrative embodiment.

FIG. 4 is an example front end (FE) configured to control an antenna at its output 420, consistent with an illustrative embodiment. The FE 400 includes a transmit path 430 and a receive path 440. The receive (RX) path 440 accepts a signal from the antenna, which is guided by the transmission line switch 410 to one or more low noise amplifiers 412 and a variable gain amplifier 416. In one embodiment, the low noise amplifier 412 is of common emitter type. The variable gain amplifier (406 and 416) may include the function of a 1-bit 180° phase shifter. The second switch 404 guides the amplified signal to the phase shifter 402 to the summation element. In one embodiment, the second transmission line switch 404 is of λ/4 type. The phase shifter 402 is configured to phase shift the received signal to implement the correct beam steering parameters. In one embodiment, the phase shifter 402 is a transmission line based loss invariant 5 bit 5° phase shifter.

In one embodiment, the FE 400 enables superior beam control through orthogonal control of the phase and amplitude. For example, using 1-bit 180° active phase shifters provided by VGA 406 and 416, respectively, in TX and RX paths, and a shared 5-bit passive phase shifter 402, the FE achieves >400° phase shift in ~5° steps, with <1° RMS error, and <1.5 dB amplitude variation. Gain control in TX and RX is achieved using a phase-invariant, differential VGA 406 and 416, providing >11 dB range with <3° phase variation. Phase invariance is achieved using a technique inherent to BJT device operation.

The transmit (TX) path 430 guides a signal from the phase shifter 402, through the transmission line switch 404 through the variable gain amplifier 406 and one or more power amplifiers (e.g., in cascade) 408 to the second transmission line 410 to the output 420 coupled to the antenna. In one embodiment, the variable gain amplifier 406 of the transmit path 430 is substantially similar to that of the receive path 440 discussed above.

Figure 5:
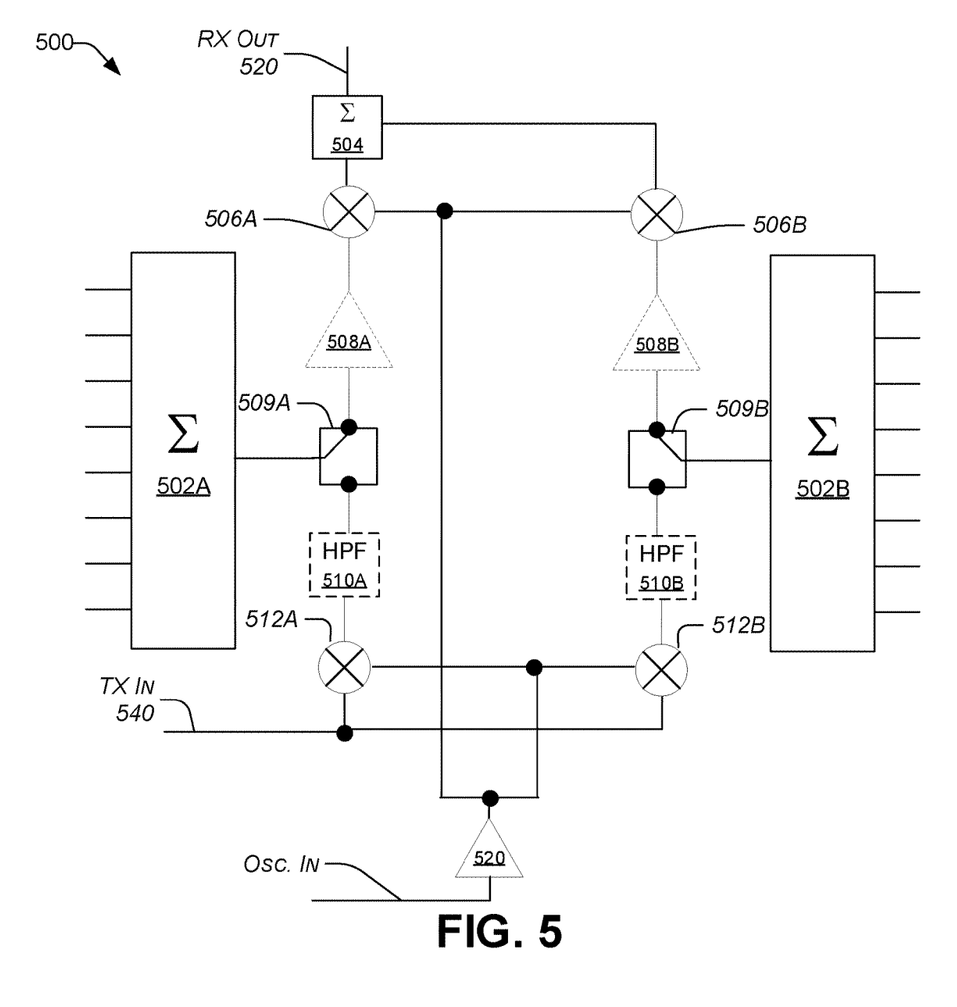
FIG. 5 is an example power controller that may be used between beamforming units, consistent with an illustrative embodiment.

Reference now is made to FIG. 5, which is an example power controller that may be used between two halves of a polarization slice, consistent with an illustrative embodiment. The controller 500 includes a left half and a right half, which include features that are mutually similar. Accordingly, aspects of the controller 500 will be discussed in the context of the left half and not repeated for the right half, for brevity.

The controller 500 is coupled to a summation element 502A having a port for each front end that it controls, similar to that of FIG. 4 described previously. In the example of FIG. 5, each summation element 502A and 502B includes eight paths to receive and/or provide signals to its corresponding front end. Each half includes a switch (e.g., 509A and 509B) operative to steer the signal from its corresponding summation element 502A and 502B in a first direction (i.e., up), thereby activating a combination mode of the controller 500. Alternatively, the switch 509A can steer the signal from its corresponding summation element 502A in a second direction (i.e., down), thereby activating a splitter mode of the controller 500.

When in combination mode, the path created by the switch 509A is between the summation element 502A, a mixer 506A operative to mix the oscillator input with the output of the amplifier 508A, down converting the signal from RF to an IF frequency, and a third summation element 504 operative to combine the signal from the left summation element 502A and the right summation element 502B (i.e., if switch 509B steers the signal from its corresponding summation element 502B to the same third summation element 504). In one embodiment, there is an amplifier 508A coupled between the switch 509A and the mixer 506A, which is operative to amplify the signal provided by the summation element 502A.

However, when in splitter mode, the path created by the switch 509A is between the summation element 502A and a mixer 512A that is operative to mix the oscillator input with the transmission input signal 540 upconverting this signal from an IF to an RF frequency. In one embodiment, there is a high pass filter 510A coupled between the switch 509A and the mixer 512A in order to filter the signal to be transmitted. Accordingly, the amplifier 508A and the high pass filter 510A are optional components. In some embodiments, these components could be replaced with signal conditioning blocks or removed altogether.

Significantly, switches 509A and 509B need not steer the signal from its corresponding summation element into the same direction. Rather, one switch (e.g., 509A) may steer its signal in a first direction, while the second switch (e.g., 509B) may steer its signal in a second direction. In this way, the controller provides the configurability discussed in the context of table 300.

Further, in one embodiment, in order to reduce power consumption and increase isolation, up-conversion mixer 512A (or 512B) is powered down when switch 509A (or 509B, respectively) steers the signal towards the receiver path. Similarly, in one embodiment, down-conversion mixer 506A (or 506B) and amplifier 508A (or 508B, respectively, if either of these is included) is powered down when switch 509A (or 509B, respectively) steers the signal towards the transmitter path.

It should be noted that as the number of elements in an array grows, the dynamic range requirements become more stringent since the amplitude of the combined signal in receiver mode grows. Further, by virtue of the architecture of FIG. 5, even at high frequencies, better linearity can be achieved. That is because at lower frequencies it is easier to implement circuits with higher linearity, where the final signal combining occurs. Accordingly, the architecture of FIG. 5 provides less demanding linearity requirements for the mixer and overall better linearity performance for the phased array.

Figure 6:
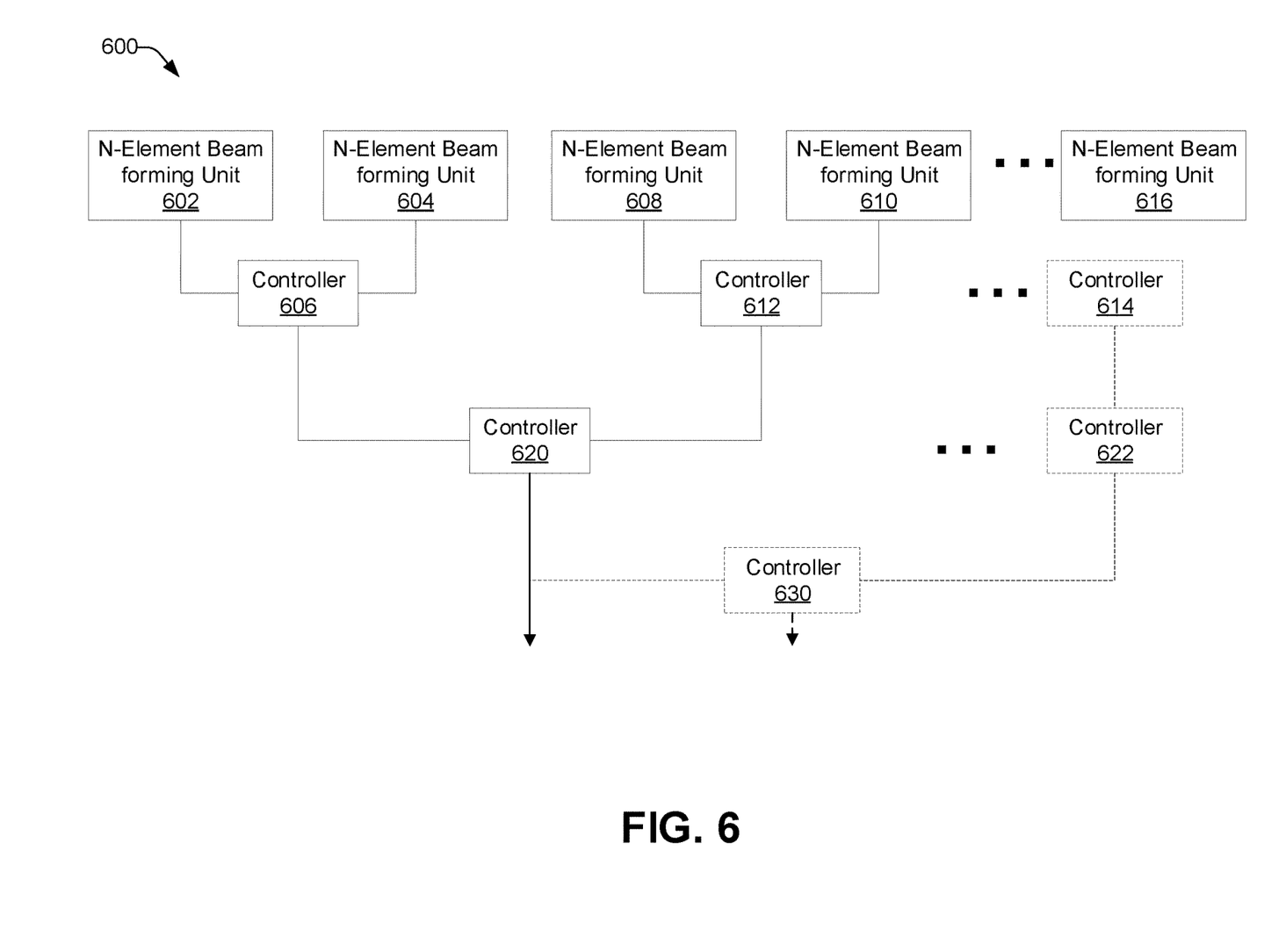
FIG. 6 is a combiner tree that can combine the power of several tiers of beamforming units, consistent with an illustrative embodiment.

FIG. 6 is a combiner tree that can combine the power of several tiers of beamforming units, consistent with an illustrative embodiment. FIG. 6 illustrates M beam forming units, each including N elements. Each pair of beam forming units has a corresponding controller. For example, beamforming units 602 and 604 have a controller 606, beamforming units 608 and 610 have a controller 612, etc. There is a second tier controller 620 configured combine the power of the beamforming units 602, 604, 608, and 610.

Each controller is configured to combine or to split beams from its corresponding pair of beamforming units. For example, controller 606 can combine a beam from the beamforming unit 602 with a beam from the beamforming unit 604. Controller 606 is also configured to split the beams from beamforming units 602 and 604.

If there are additional pairs of beamforming units, there may be additional first tier controllers, represented by controller 614, that are operative to combine the power of the corresponding beamforming units. Similarly, there may be additional second tier controllers, represented by way of example by controller 622, which are configured to combine the power of the corresponding beamforming units. Thus, there may be one or more third tier controllers (e.g., 630) and fourth tier controllers (not shown) as part of the power tree 600 that are operative to consolidate the power and focus of the beamforming units.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, the measurements herein may be preliminary and provided as an example of performance to illustrate various aspects of the architecture and techniques.

Except as stated immediately above, nothing that has been stated or illustrated is intended or should be interpreted to cause a dedication of any component, step, feature, object, benefit, advantage, or equivalent to the public, regardless of whether it is or is not recited in the claims.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A configurable phased array transceiver, comprising:
   a first beamforming unit configured to provide a first beam;
   a second beamforming unit configured to provide a second beam; and
   a first bi-directional power controller configured to combine the first beam and the second beam into a single output or to split a single transmit input into two signals, one for each beam forming unit,
   wherein each beamforming unit comprises a plurality of radio frequency (RF) front-ends, each front-end being configured to transmit or receive RF signals,
   wherein each beamforming unit is independently configurable to operate in a transmit (TX) or a receive (RX) mode concurrently.

2. The configurable phased array transceiver of claim 1, further comprising:
   a third beamforming unit configured to provide a third beam;
   a fourth beamforming unit configured to provide a fourth beam; and
   a second bi-directional power controller configured to combine the third beam and the fourth beam or to split a second single transmit input into two signals, one for the third beamforming unit and one for the fourth beamforming unit.

3. The configurable phased array transceiver of claim 2, wherein:
   each beamforming unit includes N front-end elements; and
   the first and second bi-directional power controllers are configured to provide one of:
      two simultaneous 2 X N element beams both in transmit or receive mode;
      four simultaneous beams comprising two N element beams in receive mode and two N element in transmit mode; and
      three simultaneous beams comprising one 2 X N element beam in transmit or receive mode, one N element in receive mode and one N element in transmit mode.

4. The configurable phased array transceiver of claim 2, wherein signal paths of the first and second beamforming units are independent from signal paths of the third and fourth beamforming units.

5. The configurable phased array transceiver of claim 4, wherein:
   the first and second beamforming units are configured to provide the signal on a horizontal polarization plane comprising: the first and second beamforming units being configured to provide an independent signal path for horizontal antenna ports of each RF front-end of the first and second beamforming units; and
   the third and fourth beamforming units are configured to provide the signal on a vertical polarization plane comprising: the third and fourth beamforming units being configured to provide an independent signal path for vertical antenna ports of each RF front-end of the third and fourth beamforming units.

6. The configurable phased array transceiver of claim 4, wherein each beamforming unit is bi-directional.

7. The configurable phased array transceiver of claim 1, wherein the phased array transceiver is configured to transmit and receive signals simultaneously.

8. The configurable phased array transceiver of claim 1, wherein the TX and RX modes are supported in a time division duplex (TDD) architecture.

9. The configurable phased array transceiver of claim 1, wherein each front-end comprises:
   a first switch coupled to an antenna;
   a receive (RX) path coupled between the first switch and a second switch, the RX path comprising:
      one or more low noise amplifiers coupled to the first switch; and
      a first variable gain amplifier coupled between the second switch and the one or more low noise amplifiers;
   a transmit (TX) path coupled between the first switch and the second switch, the RX path comprising:
      a second variable gain amplifier coupled to the switch; and
      one or more power amplifiers coupled between the second variable gain amplifier and the first switch; and
   a phase shifter coupled between the second switch and a summation element.

10. The configurable phased array transceiver of claim 9, wherein the first and second variable gain amplifiers each provide a 1-bit 180° phase shift.

11. The configurable phased array transceiver of claim 9, wherein the phase shifter is a transmission line based loss invariant 5 bit 5° phase shifter.

12. The configurable phased array transceiver of claim 9, wherein the one or more power amplifiers are in cascode.

13. The configurable phased array transceiver of claim 12, wherein the second bi-directional power controller comprises:
   a third switch coupled to the third beamforming unit;
   a fourth switch coupled to the fourth beamforming unit;
   a splitter coupled between the third switch and the fourth switch and operative to provide a transmit path; and
   a combiner coupled between the third switch and the fourth switch and operative to provide a receive path.

14. A method of providing a configurable phased array transceiver, comprising:
   providing a first beam via a first beamforming unit;
   providing a second beam via a second beamforming unit; and
   providing a first bi-directional power controller configured to combine the first beam and the second beam or to split a single transmit input into two signals, one for each beamforming unit,
   wherein each beamforming unit comprises a plurality of radio frequency (RF) front-ends, each front-end configured to transmit and receive RF signals, and
   wherein each beamforming unit is independently configurable to operate in a transmit (TX) or a receive (RX) mode concurrently.

15. The method of claim 14, further comprising:
   providing a third beam via a third beamforming unit; and
   providing a fourth beam via a fourth beamforming unit.

16. The method of claim 15, wherein signal paths of the first and second beamforming units are independent from signal paths of the third and fourth beamforming units.

17. The method of claim 16, further comprising: providing signals on a horizontal polarization plane comprising: the first and second beamforming units providing an independent signal path for horizontal antenna ports of each RF front-end of the first and second beamforming units.

18. The method of claim 17, further comprising: providing signals on the vertical polarization plane comprising: the third and fourth beamforming units providing an independent signal path for vertical antenna ports of each RF front-end of the third and fourth beamforming units.

19. The method of claim 14, wherein the phased array transceiver is configured to transmit and receive signals simultaneously.

20. The method of claim 14, wherein the TX and RX modes are provided via a time division duplex (TDD) architecture.

* * * * *